United States Patent [19]

Jones et al.

[11] 3,965,308

[45] June 22, 1976

[54] LINE CARD CIRCUIT

[75] Inventors: Wilson Franklin Jones; Arthur Gene Watkins, both of Santa Ana, Calif.

[73] Assignee: San/Bar Corporation, Santa Ana, Calif.

[22] Filed: Nov. 11, 1974

[21] Appl. No.: 522,790

Related U.S. Application Data

[63] Continuation-in-part of Ser. No. 377,217, July 9, 1973, abandoned.

[52] U.S. Cl. .................................. 179/99; 179/81 R
[51] Int. Cl.$^2$........................................... H04M 1/21
[58] Field of Search........... 179/1 B, 99, 81 R, 18 F, 179/1 P, 2 C, 1 C, 15 AN, 2.5 A; 333/70 R

[56] References Cited
UNITED STATES PATENTS

| | | | |
|---|---|---|---|
| 3,076,871 | 2/1963 | Bauman | 179/2.5 A |
| 3,246,082 | 4/1966 | Levy | 179/99 |
| 3,789,803 | 2/1974 | Davis et al. | 179/99 |
| 3,794,774 | 2/1974 | Kemmerly et al. | 179/99 |

*Primary Examiner*—Thomas A. Robinson
*Attorney, Agent, or Firm*—Jackson and Jones Law Corporation

[57] ABSTRACT

An improved line card circuit usable with key telephone systems is adapted to permit a message to be automatically transmitted from a subscriber key telephone station when operated to place a telephone line in a hold condition. A coupling circuit interfacing the message source and the telephone line during the hold condition of the line provides a high degree of crosstalk isolation. The coupling circuit also has the feature of automatically limiting to a predetermined level the power of the output signal supplied to the telephone line. A strappable option is provided by the coupling circuit to permit its operation with a standard eight ohm high fidelity amplifier source as well as with a 70 volt intercom systems. The line card circuit, besides these features, includes circuitry to allow full supervisory control of a telephone line to be exercised by a user of the subscriber key telephone when such unit is not in the hold condition. The line card circuit also includes circuitry that controls the operation of audible and visual indicators of an associated key telephone.

10 Claims, 5 Drawing Figures

LINE CARD CIRCUIT

CROSS REFERENCE TO RELATED APPLICATIONS

This application is a continuation-in-part of an application, now abandoned, having Serial No. 377,217, filed July 9, 1973 for LINE CARD CIRCUIT, by Wilson F. Jones and Arthur G. Watkins.

BACKGROUND OF THE INVENTION

1. Field of the Invention

This invention generally relates to line card circuits for use with key telephone systems. More specifically, the subject invention concerns an improved K.T.U. line card circuit that is adapted to enable messages to be automatically transmitted from a key telephone station in response to an associated telephone at the station being operated to place a telephone line in a hold condition.

2. Description of the Prior Art

A typical key telephone is generally used to permit a subscriber to have several different telephone lines, i.e., each having a different number, available for use with a single telephone. Such key telephones thus may be recognized by the usual several line "buttons", or the like, that may be individually operated by a user to select a telephone line to be used from among several different telephone lines connected to the telephone. For example, a particular telephone line would be selected and used by depressing the corresponding button on the telephone and converting the telephone receiver to an off-hook condition.

As is well known, line card circuits are generally used in key telephone systems to control the operating condition of a telephone line and to control the operation of audible and visual signaling devices on the telephone. A single line card circuit is installed at a subscriber telephone station for each different telephone line servicing the telephone station.

A telephone line is generally capable of being in one of three operating conditions, i.e., a ringing condition, a seize condition, and a hold condition. The ringing condition would exist during periods in which ringing signals are being received at a key telephone of a subscriber being called. An audible signaling device such as a ringer, buzzer, or the like, that is situated at the key telephone being called, will ultimately respond to such ringing signals and provide an audible indication that an incoming telephone call is being received. A light positioned beneath, or in otherwise close proximity to the line button corresponding to a line on which an incoming call is being received will usually be illuminated to identify such telephone line at the key station. Such line button light would also be illuminated to identify the telephone line in use for outgoing telephone calls.

The seize condition exists during periods in which parties to a phone call have their respective telephones operated to permit a telephone conversation to be carried on.

The hold condition is generally used by a subscriber when it is desired to interrupt a telephone call without releasing the telephone line being used. For example, a subscriber may desire to answer an incoming call on a different telephone line, although the key telephone is already in use for a conversation on a different telephone line. The telephone line already in use would be placed in a hold condition by operation of a hold button to permit the incoming call to be answered with the same key telephone. The use of the original telephone can be later resumed by simply operating (usually by depression) the corresponding line button. Obviously, the hold condition permits several telephone lines to be served at once from a single key telephone.

When a telephone circuit is placed in a hold condition, a waiting party is presently left listening to either faintly heard beeping sounds or utter silence. In the event that no beeping sound is heard, a waiting party may be in doubt whether the telephone line connection has been somehow disconnected. In any case, holding a telephone receiver to an ear to hear beeping, or silence, for any extended length of time can be annoying as no doubt many telephone users will affirm.

It is accordingly the intention of the present invention to provide an improved line card circuit that permits a message such as a musical interlude, announcement, etc., to be automatically transmitted from a telephone station at which a key telephone has been operated to place a telephone line in a hold condition, such that waiting parties may be entertained by music or otherwise have the benefit of a recorded message, etc., and be relieved of any doubt that the telephone line in use has become disconnected.

SUMMARY OF THE INVENTION

Briefly, the present invention involves an improved line card circuit usable with key telephone stations for enabling a message to be automatically transmitted to a holding party in response to the telephone line or circuit being placed in a hold condition. More particularly, the subject line card circuit includes circuitry for sensing and responding to ringing signals, circuitry for seizing the telephone line over which incoming calls are answered or outgoing calls are placed by operation of an associated key, circuitry for placing a telephone line in a hold condition in response to operation of a hold button, and means for coupling in a message source to transmit a message over the telephone line when in the hold condition. The coupling means is designed to provide maximum intertelephone line isolation for audio frequency signals, and automatically limit below a predetermined level, the power output of the message source to the telephone line. The coupling means may be utilized with either a standard high fidelity amplifier having an eight ohm output impedance or a 70 volt output public address system, having a much higher output impedance.

BRIEF DESCRIPTION OF THE DRAWINGS:

The objects and many attendant advantages of the present invention will be more readily appreciated as the same becomes better understood by reference to the following detailed description which is to be considered in conjunction with the accompanying drawings wherein like reference numerals designate like parts throughout the figures thereof and wherein.

Figure 1:
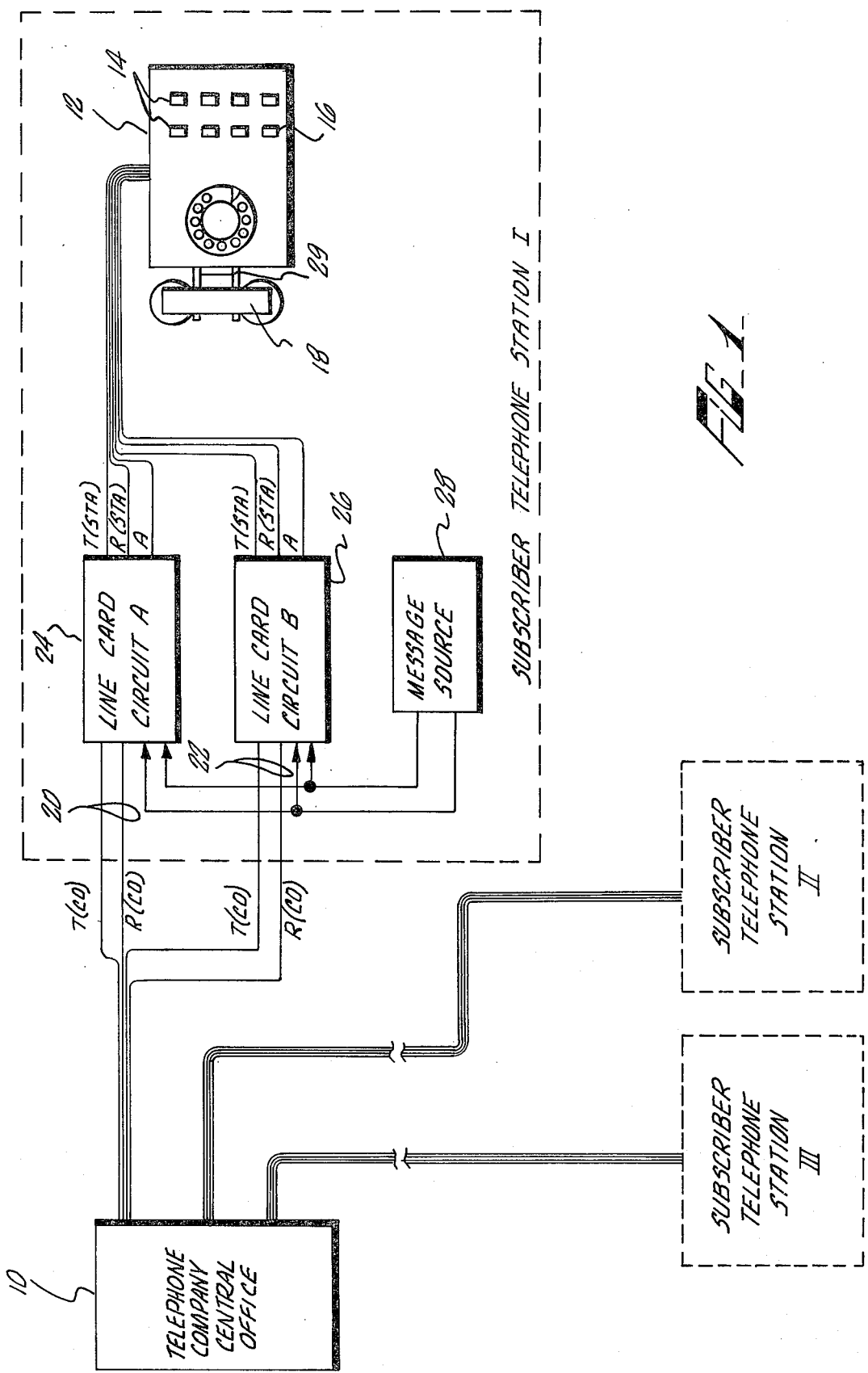
FIG. 1 is a functional block diagram of a typical key telephone system and includes line card circuits in accordance with the present invention.

DESCRIPTION OF THE PREFERRED EMBODIMENT:

Referring now to FIG. 1, a typical key telephone system would generally include several subscriber stations such as, the stations I, II and III which are connected to a distant telephone office 10. At least one key telephone unit 12 having one or more of the usual line buttons 14, a hold button 16, and a receiver 18 would be installed at each of the stations. A line card circuit is provided for each telephone circuit or line that terminates at a subscriber station. Otherwise stated, where each line button 14 corresponds to a single telephone line having a specific telephone number, a single line card circuit would be required for each line button 14. As shown, where two telephone lines 20 and 22 are connected to the key telephone, then two line buttons 14 and two line card circuits 24 and 26, one for each telephone line would be required.

A single message source 28 such as a tape recorder, radio receiver, or the like, may be provided at a telephone station to provide a desired message. As shown, the source 28 is connected to each of the line cards 24 and 26 and other like line cards that are connected to serve telephone lines over which a message is to be transmitted during a hold condition.

Each telephone line includes a standard pair of line conductors which are commonly referred to as tip and ring conductors. Line card circuit are designed to be interposed in such telephone lines. Hence, as shown in FIG. 1, the tip and ring conductors connected between the telephone 12 and the line card circuits 24 and 26 have been designated as T(STA) and R(STA). Similarly, the portions of such line conductors extending between the line card circuits 24 and 26 and the central office 10 have been designated as T(CO) and R(CO). The respective tip conductors T(CO) and T(STA) and ring conductors R(CO) and R(STA) are interconnected by the line card circuit as is explained hereinafter.

A conductor commonly known as the "A" lead also extends between the standard key telephone and its corresponding line card. The A lead is typically connected to a line button 14 and to the hold button 16 available on the key telephone 12 and also to a hook switch 29 on which the receiver 18 normally rests. Conventionally, a ground potential is applied to the A lead when both an associated line button 14 is depressed and the receiver 18 is taken "off-hook" to close the hook switch 29. Operation of the hold button 16 causes the ground potential to be removed from the A lead.

The line card circuits 24 and 26 are customarily situated at a subscriber station in somewhat close proximity to the key telephone or telephones to which they correspond. Typically, a telephone closet is used by the telephone company to house all of the necessary peripheral equipment such as line card circuits, racks, power sources, etc., that may be required for telephone service. The details of such equipment are well known and therefore are not deemed to be required for an understanding of the subject invention. Hence, no detailed description of such peripheral equipment is included herein in the interest of brevity.

As is well known, several key telephones 12 may be installed at a subscriber telephone station to receive and place calls over the telephone lines 20 and 22 although only a single key telephone 12 is shown to be installed at the subscriber telephone station I of FIG. 1. Irrespective of the number of key telephones 12 that are installed at a subscriber telephone station, only a single line card circuit is required for each different telephone line to have proper supervisory control over the telephone lines and to control operation of the audible and visual indicators provided at the several key telephones.

Incoming telephone calls received at a key telephone station will usually produce ringing of a bell or the like and flashing of a line button lamp that is familiar to most key telephone users. The line button lamp stops flashing but remains illuminated upon the incoming call being answered. Answering is normally accomplished by the telephone receiver 18 being lifted off-hook concurrently with depression of the line button 14 corresponding to the telephone line or circuit over which the telephone call is being received.

The telephone line when placed in a hold condition by depression of the hold button 16 is typically indicated at the key telephone 12 by a winking of the line button lamp. A telephone line in a hold condition may be retrieved from a hold condition by the line button corresponding thereto being depressed.

Figure 2:
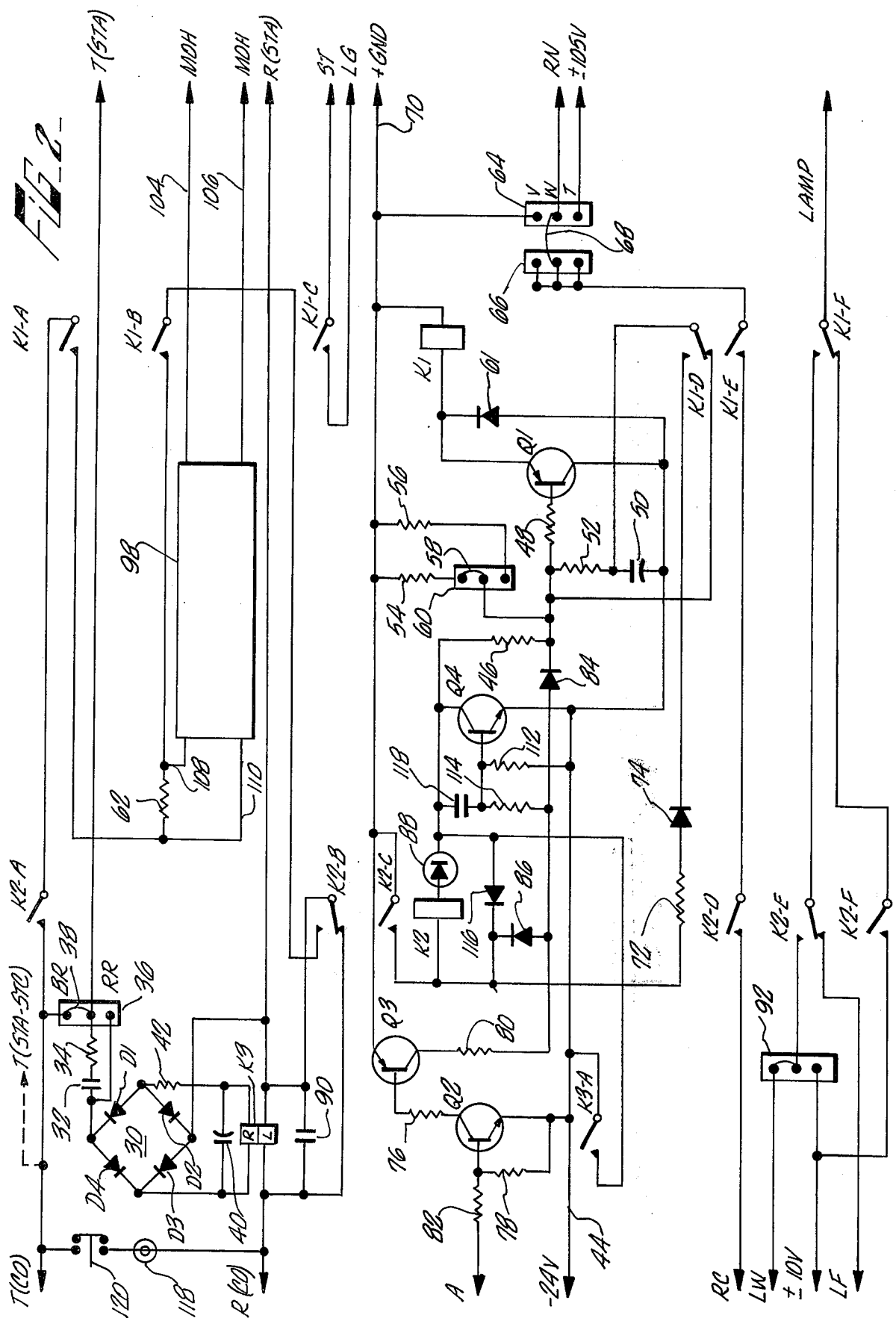
FIG. 2 is a detailed schematic diagram of a line card circuit that is useful in conjunction with key telephone systems in accordance with the present invention.

A line card circuit in accordance with the present invention is illustrated by the detailed schematic diagram of FIG. 2. As shown, the line card circuit includes three individual relays K1, K2 and K3 which generally control the major operational functions of the line card circuit. As is conventional, each of these relays include a coil, or coils, and one or more relay contacts which are shown in corresponding relationship in FIG. 2 by being vertically aligned. For example, the relay coil K1, when energized, operates six relay contacts designated K1-A through K1-F. Similarly, the relay coil K2, when energized, operates six relay contacts designated K2-A through K2-F. The relay K3 has two coils R and L which operate a contact K3-A when either of the coils R and L is energized.

The relay K1 is operated during a ringing condition to enable ringing, and associated lamp control, at a subscriber's key telephones in response to ringing signals transmitted to the subscriber's station from a central office for incoming calls. The relay K1 is also operated along with the relay K2 during a hold condition to place a telephone line in a hold condition in response to operation, or other appropriate manipulation, of the hold button on a key telephone.

The relay K2 is operated during a seize condition in response to a subscriber being "on-line". For the purposes of this description, a subscriber or user is "on-line" when the receiver 18 of a key telephone 12 is off-hook concurrently with an appropriate line button 14 being depressed on the key telephone 12. As mentioned, the relay K2 is also operated or maintained in an energized state during a hold condition to enable a telephone line to be placed in a hold condition when the relay K1 is concurrently energized.

The relay K3 serves as a switching relay and essentially operates to energize the line card circuit in response to either ringing circuit or line current flowing through the tip and ring line conductors. The ringing current is an alternating current (AC) that is present during ringing conditions and is typically transmitted from a telephone central office or other source prescribed by telephone companies. The line current is a direct current (DC) that is present during a seize or hold condition. A DC power source of a type prescribed by telephone companies is connected to supply the line current to a telephone line whenever a key telephone is in a seize or hold condition.

The line card circuit can be best understood by reviewing the operation of individual components therein with respect to the familiar functions of a telephone, such as receiving incoming calls, placing outgoing calls, and placing the telephone circuit in a hold condition or retrieving it therefrom.

Incoming Calls

Incoming calls are usually initiated by the transmission from a central office, PBX, or the like, of ringing signals over the tip and ring conductors extending therefrom. For purposes of the following description, the line card circuit 24 shown in FIG. 1 will be referred to as exemplary. Referring to FIG. 2, ringing signals are conducted through the tip T(CO) conductor and the ring R(CO) conductor to the line card circuit 24 and are detected by a rectifier bridge 30 including four diodes D1, D2, D3 and D4. These four diodes D1-D4 are connected in a standard bridge configuration to provide direct current (DC) signals at a pair of output terminals in response to the application of alternating current (AC) ringing signals to the input terminals thereof. These direct current signals produced by the rectifier bridge 30 serve to energize the relay K3 by the flow of current through a first coil R thereof.

A capacitor 32 is normally connected at an input terminal of the bridge 30 to prevent the flow of DC line current through the bridge 30 when the telephone line circuit is completed and a conversation is being conducted thereon. A resistor 34 is connected in series with the capacitor 32 to provide a high impedance to audio signals. A junction board 36 having a U-link 38 is used to connect the capacitor 32 and the resistor 34 to the tip conductor. The use of the junction board 36 allows the line card to be in conformance with telephone company requirements which demand that their "STC" mode of operation be accommodated as an option wherein ringing signals are provided from a source connected to the tip conductor T(STA). In such "STC" mode of operation, the U-link 38 is replaced to connect the center tap and the "RR" tap of the junction board 36 to effectively short circuit the capacitor 32 and the resistor 34 which become unnecessary. Finally, in such "STC" mode of operation, the tip conductor T(CO) is connected directly to the key telephone by an auxiliary connection shown by a dashed line and designated T(STA-STC).

The combination of a capacitor 40 and resistor 42 are connected in the output circuit of the bridge 30 as a low pass filter or tank circuit to prevent "chattering" of the relay K3 by periodic zero signal levels of the ringing signals.

Energization of the relay K3 produces closure of the associated relay contact K3-A to have negative potential, i.e., −24v., applied to the base terminal of a transistor Q1 via a path that may be traced from a negative terminal 44 through the closed contact K3-A and a pair of resistors 46 and 48. The transistor Q1 is thereby rendered conductive by the resulting discharge of a capacitor 50 through a resistor 52 and either of the resistors 54 or 56 which may be selected by appropriate placement of a U-link 58 of a junction board 60. As shown, the capacitor 50 and the resistor 52 are serially connected between the base and collector terminals of the transistor Q1.

The selection of either of the resistors 54 or 56 is made to adjust the time-out period for the transistor Q1 and the relay K1 controlled thereby. Specifically, the time-out period serves to maintain the transistor Q1 conductive between the conventional bursts of ringing signals. Should a call not be answered and be therefore abandoned, the contact K3-A would become reopened to remove the negative potential from the base of the transistor Q1. The capacitor 50 would then be permitted to become charged again through the resistor 52 and one of the resistors 54 or 56 which would be of different ohmage. Selection of the larger or smaller of the resistors 54 or 56 would thus permit adjustment of the RC time constant to which such resistors 54 and 56 contribute and thereby control the rate at which the capacitor 50 can become recharged to render the transistor Q1 nonconductive.

A diode 61 is connected between the collector and emitter terminals of the transistor Q1. The diode 61 serves to protect the transistor Q1 from transients that may occur from operation of the relay K1. Conduction by the transistor Q1 allows energization of the relay K1 to produce operation of the relay contacts K1-A through K1-F. Specifically, closure of the contacts K1-A and K1-B places the telephone line in a hold condition whenever the contacts K2-A and K2-B are also closed, by connecting a holding resistor 62 between the tip and ring conductors. Since the contacts K2-A and K2-B are not closed during ringing, closure of the contacts K1-A and K1-B are of no effect during the ringing period, i.e., when the telephone line is in a ringing condition.

Operation of the contact K1-C interconnects a standard pair of terminals ST and LG which allows operation of the motor of a standard interruptor, which is well known, and therefore not necessarily described in detail herein. Briefly, however, a conventional interruptor may include a motor which drives a series of cams which in turn periodically operate a number of mechanical switches which produce the desired line lamp operation and audible signaling at a key telephone. Further, in this regard, the type of ringing is controlled by the application of a conventional ringing control voltage to a terminal RC through a normally closed contact K2-D and the closed contact K1-E from a terminal RN to energize an audible signal generator, i.e., bell, buzzer, etc., which may be mounted in or near the key telephone at the subscriber station. Standard strapping options are provided by the use of junction boards 64 and 66. With a U-link 68 in the W position, as shown, interrupted ringing would be provided. The U-link 68 may be placed in the T position to have a continuous high voltage, i.e., ± 105v., provided to the ringing control terminal RC to produce a continuous audible ringing sound. When the U-link 68 is in the V position, the ringing control is grounded.

Lamp control signals are provided from a trio of lamp control terminals designated LW, ± 10v., and LF. Accordingly, the line button lamp on a key telephone is made to commence flashing for incoming calls by having the operated contact K1-F connect the lamp flashing control terminal LF to the lamp terminal L through a double-position normally positioned contact K2-E and the operated contact K1-F. As is later explained, the line button lamp is caused to assume a continuously illuminated state when the telephone line has been seized (in a seize condition) and is caused to wink during a hold condition by operation of the contacts K1-F, K2-E and K2-F.

The remaining contact K1-D that corresponds to the relay K1 serves to assist in the switching of the transistor Q1 to a nonconductive state when a subscriber is on-line (the telephone line is in a seize condition). This is accomplished by having ground potential applied to the base terminal of the transistor Q1 from a ground terminal 70 via the contact K2-C (when closed), a resistor 72, a diode 74, the contact K1-D and the resistor 52 and 48.

With the receiver 18 of the telephone 12 being converted to an off-hook condition and the appropriate line button 14 depressed, in response to the audible ringing and visually observable flashing of the line button lamp, the conventional ground potential is applied to the A lead. As earlier mentioned, the A lead is conventionally grounded only during the seize condition and left open-circuited or electrically unconnected during the ringing and hold condition. The relay K3 is maintained energized by the flow of line current through the coil L thereof.

The ground potential applied to the A lead is effectively detected by a pair of transistors Q2 and Q3 which are rendered conductive thereby. As shown, biasing resistors 76, 78 and 80 are connected to have the transistors Q2 and Q3 properly biased. An input resistor 82 is also connected to the base terminal of the transistor Q2.

Conduction of the transistor Q3 removes the negative potential from the base terminal of the transistor Q1 by having the ground terminal 70 connected thereto through the transistor Q3, the resistor 80, a protective diode 84 and the base resistor 48. The transistor Q1 is accordingly rendered nonconductive. The relay K1 is thus de-energized and the contacts K1-A through K1-F thereof are permitted to revert to the illustrated unoperated or normal positions to stop any audible ringing and flashing of the line button lamp.

Conduction of the transistor Q3 also completes an electrical path between the ground terminal 70 and the negative potential terminal 44 to energize the relay K2. Such path may be traced from the ground terminal 70, through the transistor Q3, the resistor 80, a diode 86, the relay K2, a light emitting diode 88 and the closed contact K3-A to the negative potential terminal 44. The associated relay contacts K2-A through K2-F are thus operated.

The light emitting diode 88 is illuminated whenever the relay K2 is energized to inform a repairman or the like that the telephone line to which the line card circuit is connected is in use.

Closure of the contacts K2-A and K2-B prepares the hold resistor 62 to be connected between the tip and ring conductors should the contacts K1-A and K1-B subsequently becomes closed. The line card circuit is thus primed to be placed in a hold condition upon later closure of the contacts K1-A and K1-B. The contact K2-B also connects a capacitor 90 in parallel with the relay coil L of the relay K3 to provide an audio bypass for audio or talk signals. The closed contact K2-C provides an alternate ground path from the ground terminal 70 to the relay K2 such that the relay K2 will remain energized irrespective of the nonconduction of the transistor Q3 during a hold condition due to removal of the ground potential from the A lead. The contact K2-D is opened and serves to disconnect the ringing control terminal RC from the sources of ringing power, i.e., terminal RN. The disconnection is maintained for the duration of any subsequent telephone usage (both seize and hold conditions) once the line is seized. Audible ringing signals are thereby prevented from occurring during the seize and hold conditions since the relay K1 is energized. The contacts K2-E and K2-F, as earlier mentioned, control the operation of the line button lamp. When the contact K2-F is closed, a steady lamp signal is applied to the lamp terminal through the contact K1-F which is in a normal position (illustrated) during line seizure. The contact K2-E is operated to close a connection to a winking signal terminal such that for a hold condition, a winking signal will be applied to the lamp through the operated contact K2-E and the reoperated contact K1-F which would be reversed from the illustrated position.

The telephone line connection being completed (the line being in a seize condition), a telephone conversation may take place in an ordinary fashion. The line button lamp will remain steadily illuminated until a subscriber goes off-line.

Hold Condition

To place the telephone circuit in a hold condition, the hold button on the key telephone is depressed or otherwise appropriately operated. As mentioned, the hold button is normally connected to the A lead to remove the ground potential therefrom by opening or breaking the electrical connection to a source of ground potential when the hold button is depressed. As earlier explained, the transistors Q2 and Q3 become nonconductive when ground potential is removed from the A lead. Ground potential is thus also removed from the base terminal of the transistor Q1 which is, as a result, again rendered conductive by the negative potential applied to the base terminal thereof through the path formed by the closed contact K3-A, and the resistors 46 and 48.

The relay K1 is thus energized and the resulting closure of the contacts K1-A and K1-B connects the holding resistor 62 between the tip and ring conductors since the contacts K2-A and K2-B are also closed. The telephone line is hence placed in a hold condition which persists for as long as the resistor 62 remains connected between the tip and ring conductors.

Ringing is prevented by the open contact K2-D; but the line button lamp commences to wink as a result of the winking signal provided from the winking lamp terminal LW through a junction board 92 and the operated contacts K2-E and K1-F.

A message is automatically transmitted to a waiting party for the duration of the hold condition by having a message source connected across the hold resistor 62 to be also connected between the tip and ring conductors during a hold condition. An interface circuit 98 is used to couple a message source (not shown) to the line card circuit. As shown, the message source would be connected to a pair of terminals 104 and 106 which have been both designated "MOH".

The interface circuit 98 (FIG. 3) provides the functions of a bandpass filter, automatic power limiting at its output leads 108, 110 and the capability, by strappable option, of operating with either an eight ohm message source, or a 70 volt public address system source at its input terminals 104, 106.

Input lead 104 is connected to a resistor 177 in series with a capacitor 173. Input lead 106 is connected to a resistor 179 in series with a capacitor 175. A resistor 167 is connected in series with capacitor 173. A resistor 169 is connected in series with capacitor 175. A capacitor 171 is connected across leads 104, 106 on one side of resistors 167 and 169, and a resistor 163 is connected across leads 104, 106 on the other side of resistors 167, 169. A strappable link 165 is provided to either connect resistor 163 into the circuit or leave it out depending on whether the source connected to leads 104, 106 is an eight ohm high fidelity amplifier source or a much higher impedance public address system source. A pair of opposite conducting diodes 161, 159 are connected across leads 104, 106 in parallel with the option resistor 163. A capacitor 155 is connected in series with resistor 167. A capacitor 157 is connected in series with resistor 169. A resistor 151 is connected in series with the other end of capacitor 155 and a resistor 153 is connected in series with the other end of capacitor 157. Resistor 151 is connected to output line 108 which is connected to one end of the holding resistor 62 (FIG. 2). Resistor 153 is connected to output line 110 which is connected to the other end of holding resistor 62. The audio frequency signal across lines 108, 110 will be impressed across the holding resistor 62 (FIG. 2) whenever such resistor is placed into the telephone line talking loop as explained above.

Figure 3:
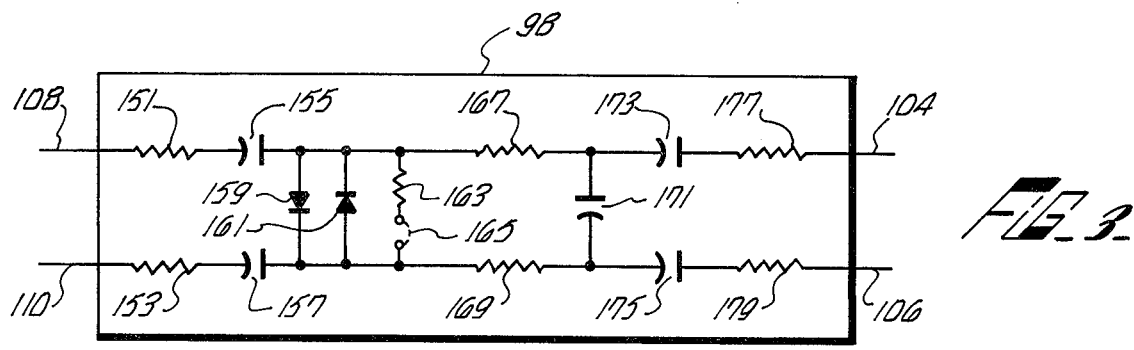
FIG. 3 is a detailed schematic diagram of the coupling circuit for interfacing a message source with the telephone line according to the present invention.
Figure 4:
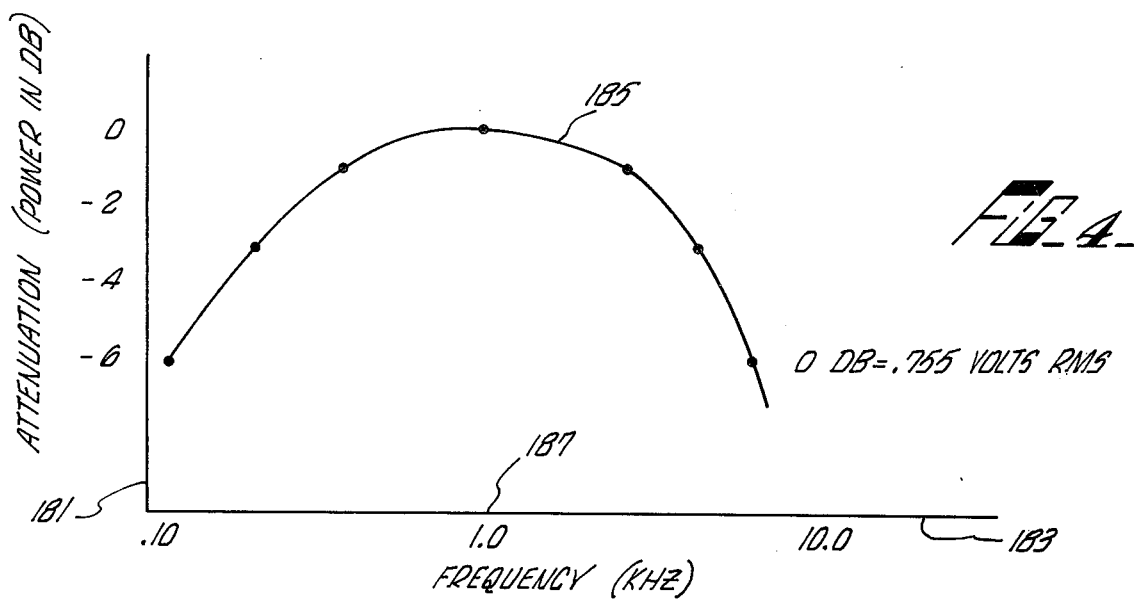
FIG. 4 is a graph illustrating the attenuation versus frequency characteristic of the circuit of FIG. 3.

FIG. 4 illustrates the frequency versus power output response of the interface circuit of FIG. 3 as measured by a db meter. The Y axis 181 of the graph is a linear scale of the power of the output signal measured in dbs. The X axis 183 is a logarithmic scale of the frequency of the input signal in kilohertz. The graph 185 illustrates that minimum attenuation of the input signal occurs at around 1,000 cycles, point 187 on the X axis. From the graph, it can be seen that the bandwidth characteristic of the circuit of FIG. 3 is approximately 200 Hz to 4,000 Hz. This provides sufficient fidelity while eliminating any spurious high frequency spikes generated by the message source.

Figure 5:
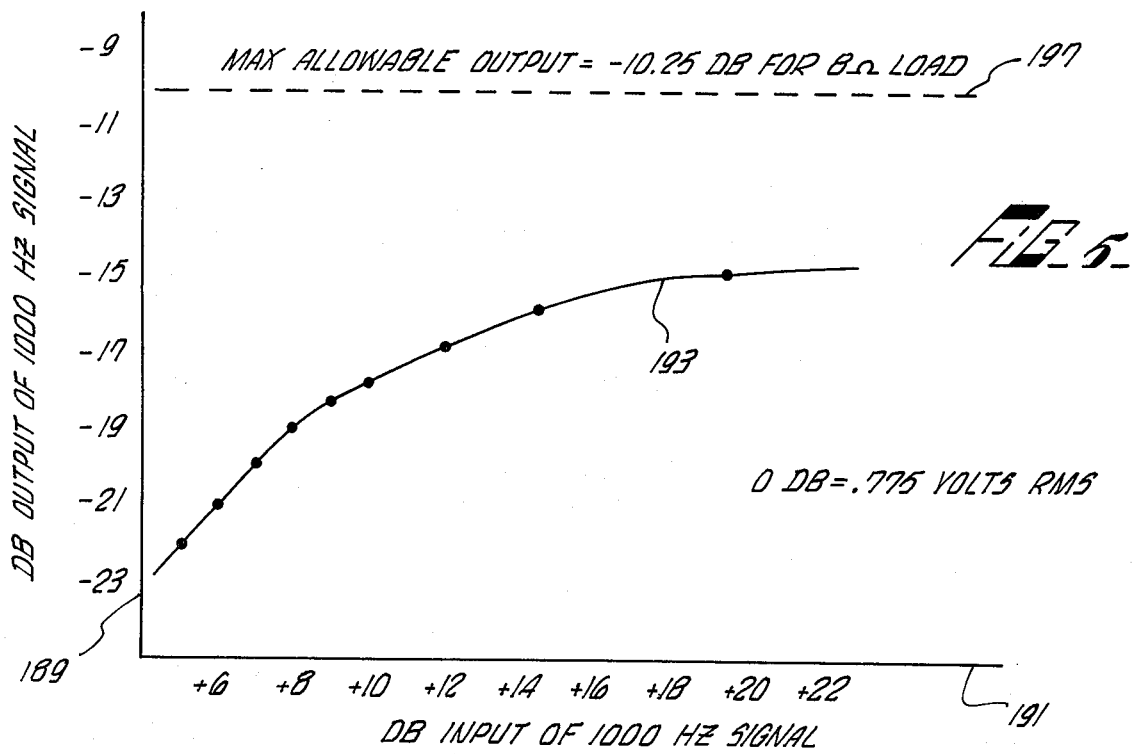
FIG. 5 is a graph illustrating the output power versus input power characteristic of the circuit of FIG. 3.

FIG. 5 illustrates the power attenuation characteristic of the circuit of FIG. 3 as measured by a db meter. The Y axis 189 illustrates the db output of a 1,000 Hz signal. The X axis 191 illustrates the db input of a 1,000 Hz signal. The maximum allowable db rating of a signal being supplied to a telephone line is a −10.25 db for an eight ohm load. This maximum is shown as a horizontal line 197. Any equipment generating signals having a greater power rating than this is not acceptable on the basis that some damage to the components in the telephone circuit might result. The normal output level for a message source applied to a telephone line is generally in the range of −23 to −21 dbm. The curve 193 illustrates that as the db rating of the 1,000 Hz input signal increases, the db rating of the 1,000 Hz output signal also increases, to a point. The output levels off sharply at around −16 or −15 db which is substantially below the maximum allowable of −10.25 db. It can thus be seen that no matter how high the power input signal, the power output will be attenuated to a level that is safe to apply to the telephone circuit.

Besides these features, the coupling circuit of FIG. 3 also prevents any audio frequency coupling between two or more key telephone units at the same subscriber telephone station. The minimum interchannel or intertelephone line isolation provided by the circuit is an attenuation of +80 db. When a message source having an eight ohm load is utilized, the db attenuation of a signal from the load to the holding resistor is approximately 27 db. The db attenuation in the reverse direction, from the hold resistor to the message source is approximately 54 db. Any audio frequency signal being impressed across the hold resistor at the first key telephone unit at the subscriber station would then be attenuated at least 80 db as it traveled from the first telephone set through the message source to the holding resistor of a second telephone set in the hold condition. If a message source having a high output impedance is to be used, the option resistor 163 must be connected into the circuit by option strap 165. With this resistor in the circuit, the coupling circuit 98 provides 46 db attenuation for a signal traveling from the message source to the holding resistor. The attenuation in the other direction will be approximately 34 db. Here again an audio frequency signal in the line circuit will be attenuated around 80 db before it gets to another key set at the subscriber station.

The telephone circuit is retrieved from a hold condition by a release of the hold button 16 on the key telephone 12. This results in ground potential being reapplied to the A lead to have the transistor Q1 again become nonconductive, the relay K1 de-energized, and the contacts K1-A and K1-B thereof, reopened.

In the event that the distant party hangs up, or otherwise abandons a call while the telephone line or circuit is in a hold condition, the flow of line current ceases. The relay K3 is accordingly de-energized, the contact K3-A is opened, and the relays K2 and K1 also become de-energized to have the line card circuit reassume an ambient state.

Outgoing Calls

A subscriber can place an outgoing call by depressing the appropriate line button 14 and converting his telephone receiver 18 to an off-hook condition to become on-line. Ground potential will then be applied to the A lead and the transistors Q2 and Q3 will be rendered conductive to complete a path from the ground terminal 70 to the coil K2 via the transistor Q3, the resistor 80 and the diode 86. The transistor Q4 will also be rendered conductive by operation of the transistor Q3 to complete a path to the −24v source via the terminal 44. The relay K2 is thus energized and the contacts thereof are operated. Reversal of the K2-B contact removes the short circuit across the L coil of the relay K3 and the resulting flow of loop current therethrough causes closure of the contact K3-A. The seize condition will be indicated by the steady illumination of the line button lamp on the key telephone. No ringing will occur at the key telephone.

The completed electrical path from the ground terminal 70 through the transistor Q3 to the base terminal of the transistor Q1 prevents conduction thereof. A transistor Q4 is connected to provide an alternate path to negative potential to maintain the relay K2 energized in the event that the contact K3-A is opened while a user or subscriber of an associated telephone is placing a call. This can occur when the central office 10 is replaced by a private branch exchange (PBX) for which calls are initiated through an operator of whom an outside telephone number is requested. The operator may typically place the telephone circuit in a "PBX hold" condition while the request is executed.

During such a "PBX hold" condition, the subscriber tip and ring conductors may be totally disconnected from the PBX. The flow of the line current through the tip and ring conductor would temporarily cease and the relay K3 would be de-energized and the contact K3-A would become opened. If the relay K2 were to be permitted to also become de-energized, the steady illumination of the line button lamp would cease even while the party placing the call remains on-line. The calling party may then improperly get the impression that he has "lost" the operator.

To prevent any such difficulty, the relay K2 is maintained energized by the transistor Q4 which, when conductive, provides an alternate electrical path to the negative terminal 44. A pair of resistors 112 and 114 serve to properly bias the terminals of the transistor Q4 to insure that the transistor Q4 is conductive whenever the contact K3-A is opened as above-described while the relay K2 is energized during a seize condition. The line button lamp will therefore remain properly lit until the PBX operator reconnects the subscriber when and if a call is completed. It is to be noted that the same operation of the transistor Q4 will not occur during a hold condition since the A lead would not be grounded and the transistor Q3 would accordingly not be conductive.

A diode 116 is connected across the relay K2 to protect the transistor Q4 by providing a discharge path for transients that may develop in the operation of the relay K2.

The telephone circuit may, once seized, be placed in a hold condition in the manner earlier described.

A busy lamp 118 and a switch 120 also serve to allow repairmen to readily determine if the telephone circuit connected through a line card circuit is in service. The lamp 118 is connected to become illuminated by operation of the switch 120 if the telephone circuit is being used. The lamp and switch combination may be replaced by a light emitting diode, or the like, if desired.

From the foregoing, it is now apparent that the present invention provides an improved line card circuit for use with key telephone systems that will enable a message to be automatically transferred to a holding party over a telephone line or circuit that has been placed in a hold condition by operation of the key telephone associated with said line card circuit. The improved line card circuit provides for automatic power output attenuation of the message signal supplied to the telephone line as well as filtering out undesirable signals generated by the message sources. In addition, the message coupling circuit prevents any cross-talk between telephone units at the same subscriber station that are simultaneously in the hold condition.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. In a telephone line circuit for use with key telephone systems including at least one key telephone set having a hold button and connected to a central facility by a pair of line conductors, said key telephone system having a ringing condition during which ringing signals are applied to said line conductors, a seize condition characterized by said line conductors being interconnected by operation of said key telephone, and a hold condition characterized by the connection of a holding impedance between said line conductors in response to operation of the hold button, an interface circuit for coupling a message source to the telephone line circuit in order to provide a message to the calling party over said pair of line conductors for the duration of said hold condition, said interface circuit comprising:
  a pair of message input terminals adapted to be connected to a message source;
  a pair of message output terminals adapted to be connected across said holding impedance; and
  means, connected between said pair of message input terminals and said pair of message output terminals, for automatically preventing the power of the signals being applied to said output terminals from exceeding a predetermined maximum level, irrespective of the power of the signals being applied to said input terminals.

2. The interface circuit of claim 1, further comprising means for preventing signals outside a certain frequency band from being applied to said output terminals.

3. The interface circuit of claim 1, further comprising means for providing a first impedance to audio frequency message signals applied to said message input terminals and a second different impedance to audio frequency signals that may be present on said line conductors.

4. The interface circuit of claim 1, further comprising means for adapting said interface circuit to operate either with an 8 ohm high fidelity amplifier source or a 70 volt public address system amplifier source.

5. At a key telephone subscriber station wherein a plurality of key telephone sets, each set having a hold button, receive the same plurality of line pairs from a central office facility, a telephone line circuit for each said line pair providing the respective key telephone set with a ringing condition during which ringing signals are applied to a respective line pair, a seize condition characterized by a particular line pair being interconnected by operation of said key telephone, and a hold condition characterized by the connection of a holding impedance across a respective line pair, an interface circuit in each said telephone line circuit for coupling a common message source to a respective line pair in order to provide a message to the calling party over said line pair for the duration of said hold condition, each said interface circuit, comprising:
  a pair of message input terminals adapted to be connected to a message source;
  a pair of message output terminals adapted to be connected across a respective holding impedance;
  means, connected between said pair of message input terminals and said pair of message output terminals for providing attenuation, having a first db rating, to audio frequency message signals applied to said message input terminals and attenuation, having a second different db rating, to audio frequency signals applied to said message output terminals, whereby any audio frequency signals that may be present on said line conductors are prevented from being impressed on another pair of line conductors also in a hold condition, through the message source; and means connected between said pair of message output terminals and message input terminals for automatically preventing the power of the signals being applied to said output terminals from exceeding a predetermined maximum level irrespective of the power of the signals being applied to said input terminals.

6. The interface circuit of claim 5, further comprising: means for preventing signals outside a certain frequency band from being applied to said output terminals.

7. The coupling means of claim 5, further comprising: means for adapting said coupling means to operate either with an eight ohm high fidelity amplifier source or a 70 volt public address system amplifier source having a much higher output impedance.

8. In a telephone line circuit for use with key telephone systems including at least one key telephone set having a hold button, an interface circuit having an input and output for coupling a message source to the telephone line circuit in order to provide a message to the calling party over said pair of line conductors for the duration of a hold condition, said interface circuit comprising:
means for severely attenuating the power of audio frequency signals applied to the input of said interface circuit when such signals fall outside a predetermined frequency band; and
means for maintaining the power of the signals at the output of said interface circuit below a predetermined maximum level, irrespective of the power of the signals being applied at the input of said interface circuit.

9. The interface circuit of claim 8 further comprising: means for adapting said interface circuit to operate either with an eight ohm high fidelity amplifier source or a 70 volt public address system amplifier source having a much higher output impedance.

10. The interface circuit of claim 8 further comprising: means for providing a first impedance to audio frequency message signals applied to the input of said interface circuit and a second different impedance to audio frequency signals that may be present on said line conductor when said holding impedance is connected between said conductors.

* * * * *